Feb. 1, 1949.     C. G. ABBOT     2,460,482
SOLAR HEAT COLLECTOR
Filed Feb. 20, 1945     2 Sheets-Sheet 1
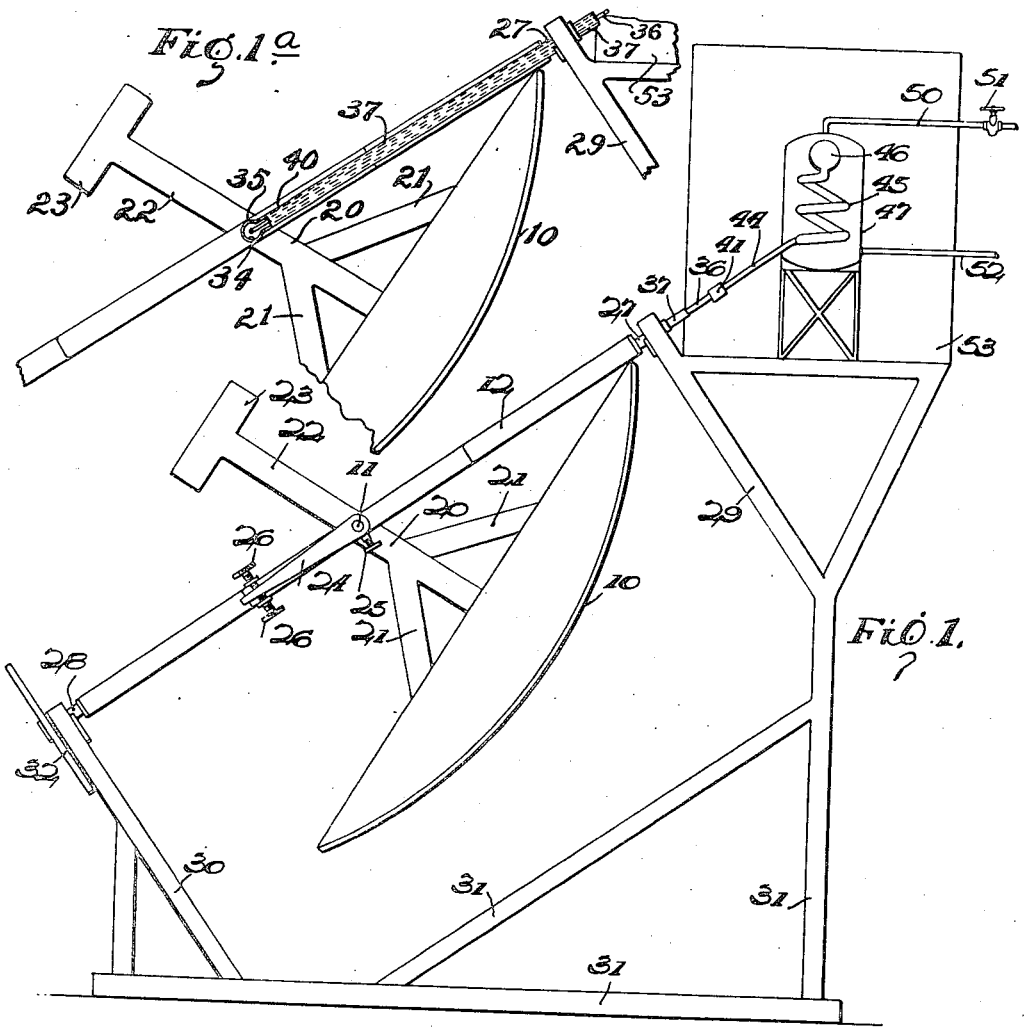
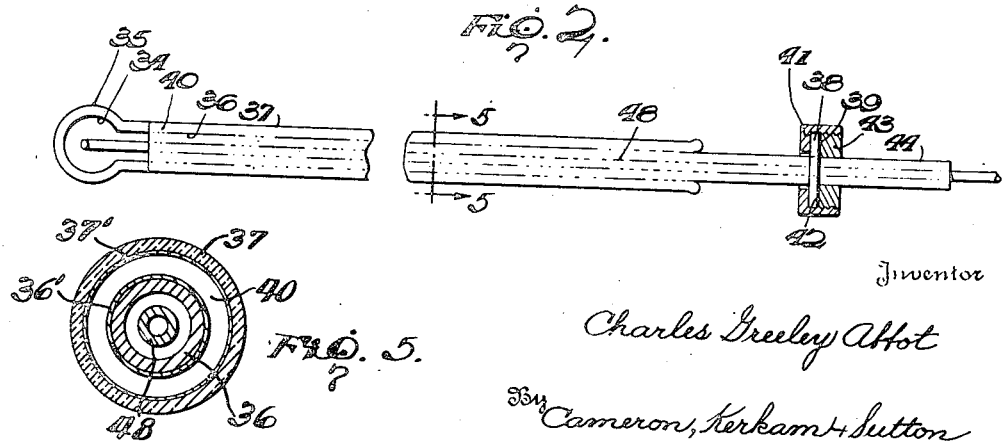
Inventor
Charles Greeley Abbot
By Cameron, Kerkam & Sutton
Attorneys Feb. 1, 1949.                    C. G. ABBOT                    2,460,482
                              SOLAR HEAT COLLECTOR
Filed Feb. 20, 1945                                            2 Sheets-Sheet 2
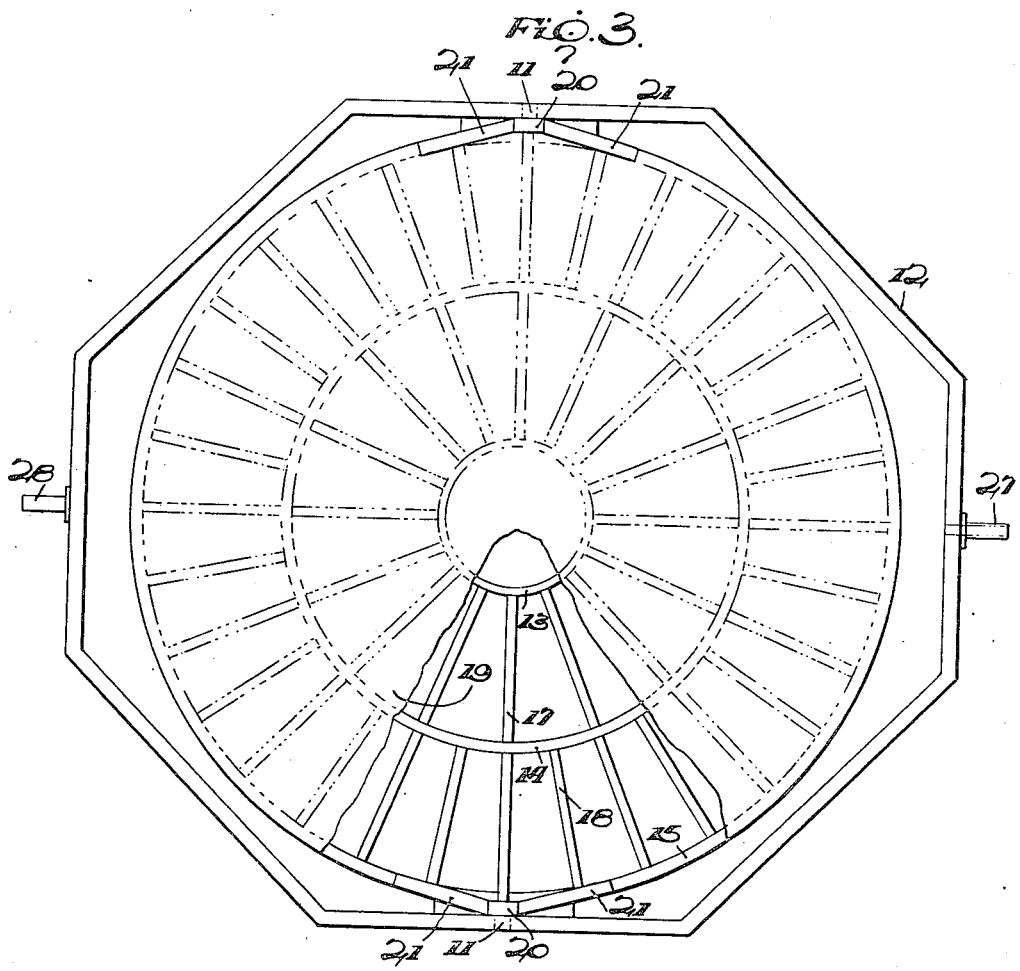
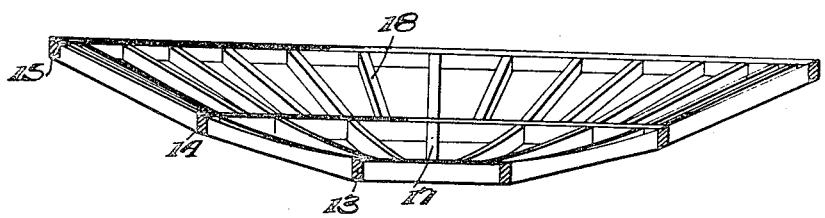

Patented Feb. 1, 1949

2,460,482

UNITED STATES PATENT OFFICE 2,460,482

SOLAR HEAT COLLECTOR

Charles Greeley Abbot, Washington, D. C.

Application February 20, 1945, Serial No. 578,806

6 Claims. (Cl. 126—271)

This invention relates to devices for collecting heat from solar rays for storage and, while applicable to the collection and storage of heat for a wide variety of purposes, will be disclosed with particular reference to the collection and storage of heat for use in a heat engine, because of particular utility in this field as will hereinafter appear, although it is to be expressly understood that the invention is not restricted thereto.

The primary object of this invention is to provide an improved device for collecting and storing solar heat under conditions of improved efficiency.

Another object of this invention is to provide an improved device for collecting and storing solar heat characterized by low cost of production, operation and maintenance.

Another object of this invention is to provide an improved device for collecting and storing solar heat which is of rugged and durable though relatively simple construction.

Another object of this invention is to provide an improved device for collecting and storing solar heat which provides for a continued supply of stored heat during nights and cloudy days.

Another object of this invention is to provide an improved device for collecting and storing solar heat that enables high efficiency operation of a heat engine.

Another object of this invention is to provide an improved device for collecting and storing solar heat characterized by high efficiency in its absorption and conservation of heat from solar rays.

Another object of this invention is to provide an improved device for collecting and storing solar heat characterized by an improved construction of reflector for the sun's rays.

Another object of this invention is to provide an improved device for collecting and storing solar heat characterized by an improved form of heat receiver.

Other objects will appear as the description of the invention proceeds.

The invention is capable of receiving a variety of mechanical expressions, one of which is illustrated on the accompanying drawings, but it is to be expressly understood that the drawings are for purposes of illustration only, and are not to be construed as a definition of the limits of the invention, reference being had to the appended claims for that purpose.

Referring in detail to the accompanying drawings wherein like reference characters are used to designate corresponding parts in the several figures, Fig. 1 is a side elevation, partly in section, of a device for collecting and storing solar heat in conformity with the present invention, the mirror or reflector being shown somewhat diagrammatically in the interest of simplicity.

Fig. 1a is a fragmentary view corresponding to Fig. 1 to show the relationship of the heat receiver to the mirror;

Fig. 2 is an enlarged and partly sectionalized diagrammatic view of the heat receiver of the present invention;

Fig. 3 is an enlarged front view of the mirror and supporting fork with part of the reflecting surface removed;

Fig. 4 is a cross section through the frame of the mirror; and

Fig. 5 is an enlarged section on the line 5—5 of Fig. 2, but not to scale.

Before proceeding with a detailed description of the embodiment of the invention illustrated on the drawings, attention is directed to certain fundamental propositions which will facilitate an understanding of the detailed description hereinafter made.

The simplest means of following the sun's diurnal path takes the form of an equatorial mounting and associated driving means which have long been perfected by astronomers, and it is to be understood that the mirror or reflector of the present invention may utilize any preferred mounting and driving means of the character referred to. Whereas in some of my earlier patents, and in the patents of other inventors, for simplicity of production of large mirrors and for simplification of the mechanism employed for following the sun, concave parabolic cylindrical mirrors have been used as ray collectors, with the mirror mounted with its axis parallel to the earth's axis, and provision has been made for rotating such mirrors at 15° per hour to follow the sun's diurnal path, but neglecting the sun's yearly march in declination, this has been attended with two evils. First, the north and south ends of these mirrors have been more or less ineffective at times of the year other than the equinoxes and varying with departure from the equinoxes, and second, since the mirrors have been made long in proportion to their width, to diminish fractionally the loss thus occasioned, this has necessitated elongated heater elements extending substantially the full length of the axis of the cylindrical mirror, with a consequent large heat loss by reason of their excessive exposed areas.

Where the means for collecting heat from solar rays have been applied to the operation of a heat engine, if high efficiency is to be obtained and also if provision is made against failure of the source of heat at night or during cloudy weather, several considerations must be kept in view. First, the temperature of the expression fluid must be high in order that the expression $$\frac{T_1-T_2}{T_1}$$

shall be as large a fraction as other considerations permit. Second, losses of heat by radiation, convection and conduction must be as low as is consistent with other considerations. To this end the surface for receiving the reflected rays must be a minimum consistent with full absorption of heat from the rays, while all losses of heat from the receiver surface and from the surfaces subjected to the medium for conveying collected heat to the engine fluid should be reduced to a minimum. Third, by cutting losses of heat from the engine fluid itself to a minimum, as by means of highly effective insulation, the collected heat may be stored for relatively long periods of time if the capacity of the reservoir be sufficiently large.

The present invention, as will appear from the ensuing description, provides an improved heat collecting and storage means that avoids defects in prior proposals concerned with the collection and storage of heat from solar rays and affords highly efficient means for reflecting and collecting heat from said rays and transferring and storing said heat with a minimum of heat loss so that it may be utilized with high efficiency and over long periods of time, such as nights and cloudy days, when solar rays are unavailable.

As shown on the accompanying drawings, the ray reflector takes the form of a circular parabolic mirror 10 pivotally mounted on trunnions 11 in a closed octagonal frame 12, herein referred to as the "fork" in conformity with astronomical usage.

While within certain aspects of this invention the mirror 10 may be of any suitable construction, I prefer to make the mirror, as shown more particularly in Figs. 3 and 4, in the form of a cradle of concave parabolic curvature composed of a plurality of circular zonal separators 13, 14 and 15 between which extend suitably spaced ribs 17 and 18. Said cradle is preferably constructed of metal of low specific gravity, such for example as Duralumin. The reflector or mirror proper is composed of pluralities of sheets of metal formed to the required curvature and suitably attached to said cradle, each zone between a pair of separators being filled with a plurality of sheets suitably mounted on said ribs with all the sheets in each zone similar to each other, but the sheets of one zone differing in shape and curvature from those of another zone. When said series of zonal sheets are attached to the zonal separators and ribs their size and curvature are such that together they constitute a continuous smooth parabolic surface 19 that is circular in cross section in planes at right angles to the axis of the reflector, i. e., the reflecting surface is in the form of a paraboloid. The concave surfaces of the constituent sheets are made highly reflecting by either a suitable coating material, for example a film of rhodium, or by being composed of any suitable highly reflecting material, for example an aluminum alloy or preparation such as "Alumilite."

The mirror 10 is supported from the fork 12 in any suitable way so as to incline its axis in a north south direction, and appropriate means such as are known to those skilled in the art are used for adjusting the mirror to conform with the declination of the sun as it varies from day to day in its north south march. As shown, the trunnions 11 carried by the fork 12 have pivotal engagement with uprights 20 disposed at diametrically opposite sides of the mirror and illustrated as attached to the outermost zonal separator 15, and said uprights may be provided with any suitable braces 21 extending between the same and the zonal separator 15 to give adequate rigidity to the structure. One or both of said uprights 20 is extended beyond its trunnion 11 as shown at 22 and provided with any suitable counterweight 23. The means for adjusting the mirror 10 on its trunnions 11 may be of any suitable construction such as commonly used in astronomical instruments. As shown, an arm 24 is associated with at least one of the trunnions 11, said arm surrounding the trunnion and carrying a screw 25 for clamping said arm to the trunnion in any suitable way as by means of a key. The other end of the arm 24 extends between a pair of adjusting screws 25 operating in nuts suitably mounted on the fork 12. A rough adjustment of the location of the mirror 10 may be effected by first loosening the screw 25 and approximately positioning the axis of the mirror 10, after which the screw 25 may be tightened and accurate adjustments thereafter effected through manipulation of the screws 26, 26. Thereby the axis of the paraboloid may be adjusted daily in a north south direction to conform with the position of the sun in its annual march.

Fork 12 is provided with a second pair of trunnions 27 and 28 in a plane at right angles to the trunnions 11, and said trunnions are mounted by means of any suitable bearings, preferably roller bearings, in supports 29 and 30 carried by any suitable framework 31. Trunnion 28 carries any suitable means for rotating the fork 12 around the axis of the trunnions 27, 28 to cause the mirror 10 to move through an angle of 15° per hour in following the diurnal movement of the sun. Any suitable means may be employed for this purpose, such for example as shown in my patents numbered 2,141,330 and 2,205,378, or any other appropriate means known to those skilled in the art. For simplicity said means have not been shown in detail but are represented by a wheel 32 carried by the trunnion 28 and which may be driven by a worm, belt, etc., from an electric motor, gravity motor, etc., appropriately supported on or adjacent the frame 31.

Disposed in the plane of the fork 12 so that the mirror 10 may focus its rays upon a selected spot thereon is a heat receiver shown somewhat diagrammatically in enlarged detail in Figs. 2 and 5. In its preferred form said heat receiver is composed of two concentric transparent globes 34 and 35 whose centers lie in the axis of the paraboloid formed by the mirror 10, and also in the axis of the trunnions 27, 28 and the axis of the trunnions 11 at approximately the focus of said paraboloid. Said globes are formed integrally with or suitably sealed upon the ends of two coaxial tubes 36 and 37, and the end of the tube 37 opposite from the globe 35 is sealed in any suitable way upon the tube 36. The tubes 36, 37 extend through the trunnion 27 which is made hollow for this purpose, and beyond the seal the tube 36 has formed thereon or suitably attached thereto a flange 38 which has a ground flat surface 39. The chamber 40 between elements 34, 36 and 35, 37 is airtight and is preferably evacuated to a high degree of vacuum. So much of at least one of the walls, and preferably both walls, defining this evacuated space 40 as are not designed to be penetrated by rays focused by the mirror 10 is plated, either interiorly or exteriorly as preferred, with a reflecting metallic coating, for instance by the well known technique known as "silvering," as shown at 36', 37' in Fig. 5. The globes 34, 35 are transparent at least at their hemispheres directed toward the mirror 10, and for simplicity may be transparent throughout, but if preferred the outer hemispheres of said globes may be provided with a reflecting metallic coating as in the case of the tubes 36, 37.

As will now be apparent to those skilled in the art, the mirror 10 is adapted to transmit to the interior of the inner globe 34 rays focused by the mirror 10 along its axis. Owing to the elimination of convection in the chamber 40 escape of heat from the interior of globe 34 and its associated tube 36 has been effectively hindered, and by plating to provide a reflecting coating over one or both of the opposed walls of the evacuated chamber 40 not required to be transparent to receive the rays focused by the mirror 10, cooling by radiation outwardly from the globe 34 and associated tube 36 is nearly eliminated.

Attached at flange 38 in any suitable way, as by screw collar 41 and washer 42, is a flange 43 carried by tube 44, which may be made of metal and which through the joint thereby effected is hermetically sealed to the end of the tube 36. Tube 44 at its opposite end communicates with a coil 45 having at its opposite end an expansion chamber 46 and mounted within a liquid containing chamber 47 as hereinafter referred to. The system composed of globe 34, tube 36, tube 44 and coil 45 with its expansion chamber 46 is substantially filled, with only such space left as is requisite for expansion, with a liquid which is highly absorbent for sun rays and preferably of high boiling point. Any suitable liquid may be used for this purpose, such as one of the chlorinated dyphenols, for example "Arochlor" produced by the Monsanto Chemical Company having a boiling point on the order of 355° C. and of dark color. This liquid is preferably made more completely heat absorbent by suspending therein a suitable quantity of finely divided lampblack.

Extending axially through the tubes 36 and 44 is a tube 48 that may be made of metal and which reaches nearly to the bottom of the globe 34 at one end and connects with the coil 45 at its other end, said tube 48 being open at both ends. Tube 48 thus constitutes a return tube for the liquid which is heated in the globe 34 and, arising through the tubes 36 and 44 to the coil 45, exchanges its heat with the fluid in the chamber 47, whereupon the cooler liquid in the coil 45 returns through tube 48 to the globe 34. Thus a gravity circulation is maintained between the coil 45 and the globe 34.

As an alternative construction globe 34 and tube 36 may be made of metal rendered highly absorbent of solar rays by suitably coating the surface of globe 34 onto which said rays are focused with lampblack or other suitable heat absorbing material. This construction is more efficient in that it eliminates reflection from the globe 34 but introduces the disadvantage of dissimilar materials at the seal between the tube 36 and globe 35, making it more difficult to maintain the hermetic seal at this point. As a further alternative construction the members 34, 35, 36 and 37 may be made of glass as heretofore explained but metal members rendered highly heat absorbing at the area upon which the rays are focused may be inserted within the elements 34 and 36. This, however, sacrifices some of the efficiency because the globe 34 will reflect sun's rays from its inner surface to a greater extent than where said surface is one between glass and Arochlor whose index of refraction approaches that of glass.

While I prefer to make the heat receiver with a globular transparent portion, comparable to a round bottom flask such as called by chemists a "matrass," because the globular form is more efficient as a receiver of the cone of rays reflected along the axis of the paraboloid constituted by the mirror 10, its is to be understood that, within the present invention and for greater facility of construction, the receiver may take other forms, as the form of closed end tubes having suitable portions at or adjacent their closed ends on where the reflected rays are to be focused, rendered transparent or otherwise suitably formed to transmit heat energy to the liquid in the inner vacuum-jacketed tube with other surfaces plated to minimize radiation as above described.

The coil 45 with its expansion chamber 46 is supported in the chamber 47 in any suitable way, said chamber being provided with strong rigid walls capable of withstanding the pressure to be generated therein. Chamber 47 contains any suitable fluid, as water for example, that may be vaporized if a heat engine or other instrumentality using vapor is to be employed, although as above indicated the present invention is not limited to utilizing the heat stored in the fluid in the chamber 47 in a heat engine, but said fluid may be such as is suitable for utilizing the stored heat in a variety of other ways. Chamber 47 has an outlet conduit 50, in which may be disposed a suitable cock 51, for conveying the heated fluid to its place of use, and a return pipe for the fluid is indicated at 52. The chamber 47 is enclosed in efficient insulation 53 sufficient to prevent loss of heat at any considerable rate, whereby heat imparted to the fluid in chamber 47 may be conserved for use at night or during cloudy periods. The unit including the chamber 47 and its insulation 53 have been shown as supported from the frame 31 but, as will be apparent to those skilled in the art, said unit may be supported in any other suitable way and disposed at any other suitable location. For the protection of the heat receiver as above described the same may be provided with any suitable enclosure of metal or the like, omitted from Fig. 2 in the interest of illustrating the parts that would be enclosed thereby, said enclosure suitably exposing the proper portion of the heat receiver to the reflected rays, and passing through the trunnion 27 and being supported from the support 29 in any suitable way.

In operation the mirror 10 is adjusted so as to concentrate the reflected solar rays upon the globes 34, 36, and these rays, passing through said globes, heat the absorbent liquid in globe 34 and set up the circulation heretofore described whereby the absorbed heat is transmitted to the coil 45 to heat the fluid in chamber 47. Escape of heat from the chamber 47 is prevented by the insulation 53, and the fluid in said chamber can be raised to a suitable temperature, well above the boiling point of water, whereby high temperature vapor is available for use at any time during the day or night.

Some of the advantages of the present invention will appear from the following considerations. A highly reflecting metal mirror in the form of a paraboloid may reflect 82% of the solar rays and the paraboloid may be sufficiently accurate to focus this percentage of the rays on a cross section whose diameter does not exceed ⅓ inch for each one foot of external radius of the mirror. Because of this high efficiency in focusing the reflected rays within a small area I prefer to make the mirror 10 in the form of a paraboloid as explained, but as will be apparent to those skilled in the art the mirror 10 may depart somewhat from a paraboloid with some loss in efficiency while still retaining some of the advantages of the present invention.

Assume that the mirror 10 has a diameter of 15¼ feet. Experiments in many lands have shown that sun rays falling on a mirror oriented at right angles to the beam may be assumed conservatively to contain energy equal to 1.2 calories per square centimeter per minute throughout an average cloudless day in moderate latitudes. Where extraordinarily favorable conditions exist this figure may reach 1.4 calories or even higher. A mirror of 15¼ feet diameter will therefore receive an average of about 203,000 calories per minute or more through average cloudless days, and if the globe 34 is made three inches in diameter it will catch substantially all of the rays reflected from the mirror 10. Of the rays reaching the globe 35, about 92% will be transmitted to the globe 34. Of the rays reaching the globe 34, about 95% will be transmitted through its transparent wall and be absorbed by the black liquid.

If the collection of heat at the reservoir 47 is continued until the temperature of the fluid therein reaches 300° C., and assuming that it is used in a heat engine operating between 300° C. and 20° C., the thermodynamic quantity $$\frac{T_1 - T_2}{T_1} = \frac{280}{573} = 0.49$$

The loss of heat may be neglected except where the transparent globes 34, 36 lose heat by radiation and thence by convection. The loss of heat from a perfect radiator at 300° C. to absolute zero is 8.888 calories per square centimeter per minute, but the globe 36 to which the globe 34 radiates may be assumed to be at 36° C. It will therefore reradiate upon globe 34 at the rate of 0.76 calory per square centimeter per minute, so that the figure for the loss of heat from globe 34 is reduced to 8.12 calories. The surface of globe 34 is 176 square centimeters and hence if it is a radiator throughout its surface the total heat loss per minute is only 1430 calories. This is slightly less than 1% of the heat absorbed by the globe 34.

An excellent heat engine may have as high as 75% efficiency of the so-called perfect engine. Combining the preceding figures of efficiency there is thus the capacity for conversion into mechanical work of the following fraction of the solar radiant energy which strikes the mirror:

$$0.82 \times 0.92 \times 0.95 \times 0.99 \times 0.49 \times 0.75 = 0.26 \text{ or } 26\%$$

Thus while 203,000 calories per minute are intercepted by the mirror, 52,780 calories may be converted into mechanical work by a construction conforming to the present invention. As 10,164 calories per minute are the equivalent of one horsepower, this figure shows that a mirror of 15¼ feet in diameter may suffice for a five horsepower solar heat engine plant. By concentrating a number of five horsepower solar units as described and connecting them to deliver heat to a common reservoir, solar rays may be utilized for building considerable potential power at minimum expense. At the same time each unit may be kept small enough so that the difficulties which would be introduced by wind if larger mirror surfaces were employed are avoided. Particularly in relatively cloudless regions a solar heat engine unit as herein disclosed may thus compete favorably with small power units using power derived from coal or hydraulic sources, while by combining units as hereinbefore mentioned larger sources of power may be made readily available at low cost.

While the embodiment of the invention illustrated on the drawings has been described with considerable particularity, it is to be expressly understood that the invention is not restricted thereto, as the same is capable of receiving a variety of mechanical expressions, some of which will now readily suggest themselves to those skilled in the art, while changes may be made in the details of construction and in the arrangement and proportion of parts, and certain features may be used with other features, without departing from the spirit of this invention. Reference is therefore to be had to the appended claims for a definition of this invention.

What is claimed is:

1. In a solar heat collector, in combination with a paraboloidal mirror, a heat receiver including a globe of material highly transmissible to heat rays disposed at the focus of said mirror and a tube communicating therewith, said globe and tube being filled with a highly ray-absorbing high boiling-point liquid, and a second globe and communicating tube surrounding but spaced from said first globe and tube, said second globe being formed of transparent material, said second tube being sealed hermetically to said first tube at the end of said second tube opposite its globe and the space between said globes and tubes being highly evacuated, said tubes having their opposed walls plated with reflecting metal, and a heat exchanger in communication with said first-named tube.

2. In a solar heat collector, in combination with a paraboloidal mirror, a heat receiver including a glass globe at the focus of said mirror and a glass tube communicating therewith, said globe and tube being filled with a highly ray-absorbing high boiling-point liquid and a transparent vacuum jacket surrounding said globe and tube, the interior of said vacuum jacket surrounding said tube being provided with a highly reflecting metal film, and a heat exchanger in communication with said first named tube.

3. In a solar heat collector, a heat receiver including a globe of material which is highly transmissible to heat rays and a tube communicating therewith, said globe and tube being filled with a highly ray-absorbing high boiling-point liquid, a second globe and communicating tube surrounding but spaced from said first globe and tube, said second globe being formed of transparent material, said second tube being sealed hermetically to said first tube at the end of said second tube opposite its globe and the space between said globes and tubes being highly evacuated, said tubes having their opposed walls plated with reflecting metal, a heat exchanger in communication with said first-named tube, a return tube in said first-named tube and in communication with said heat exchanger for promoting gravity circulation of said liquid, a ray reflector substantially in the form of a paraboloid, and means for mounting said heat collector with said globes substantially at the focus of said reflector.

4. In a solar heat collector, a heat receiver including a glass tube having a closed end with the portion thereof adjacent said end transparent to heat rays, said tube being surrounded by a transparent vacuum jacket, said tube containing a highly ray-absorbing high boiling-point liquid, the interior of said vacuum jacket elsewhere than opposite the transparent portion of said first named tube having a highly reflecting metal film, a heat exchanger in communication with said first-named tube, a return tube in said first-named tube and in communication with said heat exchanger for promoting gravity circulation of said liquid, a ray reflector substantially in the form of a paraboloid, and means for mounting said heat collector with said transparent portion of said first named tube substantially at the focus of said reflector.

5. In a solar heat collector, a heat receiver including a glass globe and a glass tube communicating therewith, said globe and tube being filled with a highly ray-absorbing high boiling-point liquid and a transparent vacuum jacket surrounding said globe and tube, the interior of said vacuum jacket surrounding said tube being provided with a highly reflecting metal film, a heat exchanger in communication with said first-named tube, a return tube in said first-named tube and in communication with said heat exchanger for promoting gravity circulation of said liquid, a ray reflector substantially in the form of a paraboloid, and means for mounting said heat collector with said globe substantially at the focus of said reflector.

6. In a solar heat collector a paraboloidal mirror, a mounting for said mirror, said mounting adapted to maintain the focus of solar rays reflected from said mirror upon a fixed spot, a primary glass tube exteriorly metal-plated over a major portion of its length, but with a short unplated portion, said mounting adapted to maintain said unplated portion of said primary tube in the focus of said mirror, a secondary glass tube spaced exteriorly from said primary glass tube, said secondary glass tube having interiorly-plate and unplated portions opposite, respectively, to said plated and unplated portions of said primary glass tube, said secondary glass tube hermetically sealed to said primary glass tube at the plated end thereof, the space between said primary and secondary glass tubes being highly evacuated, a hermetically sealed primary receptacle for liquid in canalized communication with said primary glass tube, an open-ended tube within said primary glass tube, extending approximately from the non-plated portion thereof to within said primary receptacle for liquid, a highly ray-absorbing, high boiling-point liquid within said primary glass tube and said primary receptacle, a heat-insulated secondary receptacle for liquid surrounding said primary receptacle, the liquid contained in said secondary receptacle immersing said primary receptacle, the whole combination adapted to collect heat from solar rays and transfer said heat by circulation of said high-boiling liquid for storage in the liquid within said secondary receptacle.

CHARLES GREELEY ABBOT.

REFERENCES CITED

The following references are of record in the file of this patent:

UNITED STATES PATENTS

| Number | Name | Date |
| --- | --- | --- |
| 73,355 | Marshall | Jan. 14, 1868 |
| 507,999 | Davis | Nov. 7, 1893 |
| 787,145 | Brown | Apr. 11, 1905 |
| 797,891 | Himalaya | Aug. 22, 1905 |
| 820,127 | Pope | May 8, 1906 |
| 888,054 | Aschenbrenner | May 19, 1908 |
| 922,174 | Lyman | May 18, 1909 |
| 980,505 | Emmet | Jan. 3, 1911 |
| 1,068,650 | Harrison | July 29, 1913 |
| 1,242,511 | Bailey | Oct. 9, 1917 |
| 1,696,003 | Harvey | Dec. 18, 1928 |
| 1,832,248 | Schrader | Nov. 17, 1931 |
| 1,951,403 | Goddard | Mar. 20, 1934 |
| 2,119,009 | Elias | May 31, 1938 |
| 2,133,649 | Abbot | Oct. 18, 1938 |
| 2,247,830 | Abbot | July 1, 1941 |

FOREIGN PATENTS

| Number | Country | Date |
| --- | --- | --- |
| 551,598 | France | Jan. 11, 1923 |
| 555,420 | France | Mar. 22, 1923 |
| 556,333 | France | Apr. 11, 1923 |
| 635,283 | France | Dec. 27, 1927 |
| 824,726 | France | Nov. 18, 1937 |